United States Patent Office 3,553,211
Patented Jan. 5, 1971

3,553,211
QUATERNARY AMMONIUM STEROIDS
David J. Ellis, Mountain View, and David H. Rammler, Palo Alto, Calif., assignors to Syntex Corporation, Panama, Panama, a corporation of Panama
No Drawing. Filed Aug. 8, 1968, Ser. No. 751,072
Int. Cl. C07c 173/10
U.S. Cl. 260—239.5
26 Claims

ABSTRACT OF THE DISCLOSURE

Quaternary ammonium steroids having anti-bacterial activity which are prepared by the reaction of a diazabicycloalkene with a halogen substituted steroid or a steroid substituted with a displaceable radical such as methanesulfonyloxy or toluenesulfonyloxy.

---

This invention relates to novel quaternary ammonium steroids. More particularly, the present invention relates to quaternary ammonium steroids characterized by the following Formula A:

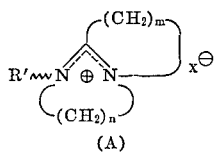

(A)

in which R' represents a steroid molecule; $m$ is a positive integer of two to seven; $n$ is a positive integer of two to four; and $x$ is a pharmaceutically acceptable anion. The wavy line ($\xi$) indicates that the configuration between the carbon atom of the steroid molecule and the diazabicycloalkene can be alpha, beta or a mixture of alpha and beta. The broken line (– – –) indicates resonance in the diazabicycloalkene group.

The quaternary ammonium steroids of the present invention are prepared by a displacement reaction in which a halogen atom, preferably bromo, chloro or iodo, or other radical, such as methanesulfonyloxy or p-toluenesulfonyloxy, on the steroid molecule is displaced by a diazabicycloalkene of Formula B resulting in the quaternary ammonium steroids (A).

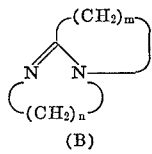

(B)

In the preparation of the compounds of the present invention, the reaction between the steroid molecule and the diazabicycloalkene molecule can be carried out in an organic solvent inert to the reaction, such as benzene, toluene, diglyme, petroleum ether, hexane, pentane, xylene, tetrahydrofuran, and the like, at a temperature of from room temperature or lower to the reflux temperature of the reaction mixture. Generally, it is preferable to employ elevated temperatures, such as reflux temperature. To minimize side reactions, the reaction is preferably run under anhydrous conditions and under an inert atmosphere, such as nitrogen. The proportion of reagents is not critical. Equimolar amounts of the steroid and diazabicycloalkene are suitable and preferably a slight molar excess of the diazabicycloalkene reagent. The progress of the reaction can be followed by thin layer chromatography and, depending upon the reaction temperature, generally takes from about 15 minutes to two hours or more to go to completion. In most cases, depending upon the stereochemistry of the steroid molecule, complete or partial inversion takes place. Generally, when the halo or other displaceable radical is attached to a fully saturated carbocyclic ring of the steroid molecule, inversion takes place yielding only one isomer. When the halo or other displaceable radical is attached to an unsaturated carbocyclic ring of the steroid, the reaction may yield a mixture of isomers. The isomers can be separated using fractional crystallization or chromatography.

Diazabicycloalkenes of Formula B are commercially available or, if desired, can be synthesized using the procedure of Oediger et al., Chem. Ber., 99, 2012 (1966) or Oediger and Moller, Angew. Chem. Internat. Edit., 6, No. 1, 76 (1967). The diazabicycloalkenes of Formula B include 1,5 - diazabicyclo[4.3.0]non-5-ene, 1,5-diazabicyclo[5.4.0]undec - 5 - ene, 1,4-diazabicyclo[3.3.0]oct-4-ene, 1,6-diazabicyclo[5.3.0]dec-6-ene, 1,5-diazabicyclo[6.4.0] dodec-5-ene and 1,6-diazabicyclo[7.5.0]tetradec-6-ene.

The term "steroid," as used herein, refers to steroids obtained from natural sources, synthetically modified natural steroids and steroids obtained by total synthesis. Preferably, the steroid molecule or backbone contains at least 17 carbon atoms. The term "steroidal halide," as used herein, refers to a halogen substituted steroid. Preferably, a bromo, chloro, or iodo substituted steroid containing at least 17 carbon atoms wherein the halogen atom is at one of positions C–3, C–6, C–7, C–16, C–17, C–20, C–21, C–22, C–23 or C–24. Suitable steroidal starting materials include steroidal halides or steroids containing an equivalently functionalized displaceable radical, such as methanesulfonyloxy or toluenesulfonyloxy of the gonane, estraine, androstane, pregnane, 19-norpregnane, cholestane, sapogenin, stigmastene, alkaloid or ergostane series. Homo- and nor-steroids, such as the A-homo, B-homo, D-homo, A-nor and B-nor steroids are also suitable.

In addition to the radical which is displaced by the diazabicycloalkene radical, the steroid molecule can have present other radicals or substituents. Substituents or groups which can be present on the steroidal starting material include hydroxyl, ester groups, ether groups, oxo, fluoro, amino, alkyl, thio, silyl and other conventional substituents of the steroid art.

Substitutents on the steroidal starting material which are sensitive to base, such as ester groups, may be hydrolyzed in part or completely during the reaction. The steroidal starting material can be saturated or contain mono- or polyethylenic unsaturation at, for example, C–1, C–3, C–4, C–5, C–6, C–7, C–22, C1,4, C–4,6, C–5,7, C–3,5, C–7,22, C–5,22, C–5,7,22, C–1,3,5(10), C–1,4,6, C–1,3,5(10), 6,8 and the like.

The steroidal starting materials which are used for preparing the novel quaternary ammonium steroids of the present invention are commercially available or can be prepared using known methods. Steroidal halide starting materials are prepared by treating the steroid molecule with a halogenating agent such as N-bromosuccinimide, N-chlorosuccinimide, triphenylphosphine dibromide, cupric bromide, thionyl chloride, N-bromoacetamide, phosphorus tribromide, phosphorus pentachloride, phosphorus pentabromide, and the like. Methods of halogenation using the foregoing reagents and others are described in the art.

See, for example, U.S. Patents 2,255,073; 2,262,244; 2,311,050; 2,468,859; 2,531,688; 2,568,025; 2,577,226; and 2,673,206; Wagner and Zook, Synthetic Organic Chemistry, John Wiley & Sons, Inc., 88 (1953); Djerassi, Steroid Reactions, Holden-Day, Inc., 179 (1963); Fieser and Fieser, Reagents for Organic Synthesis, John Wiley & Sons, Inc., 161, 862, 865–7, 875, 1247 (1967); and Glazier, J. Org. Chem., 27, 4937 (1962).

Included among the quaternary ammonium steroids of the present invention of Formula A above are those of the following Formulas I–XVI:

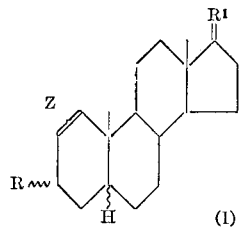 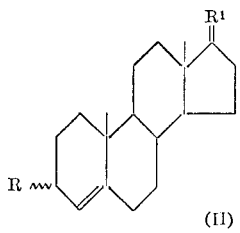
(I)    (II)

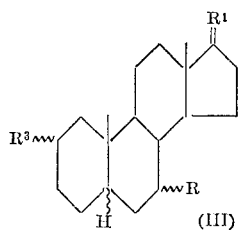 and 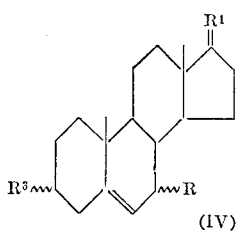
(III)    (IV)

wherein R is the group

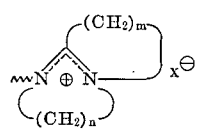

in which m, n and x are as defined above;
R$^1$ is oxo or the group

in which R$^2$ is hydrogen, hydroxy and pharmaceutically acceptable esters and ethers thereof, acetyl or lower alkyl of one to ten carbon atoms;
R$^3$ is hydrogen or hydroxy and pharmaceutically acceptable esters and ethers thereof; and
Z is a carbon-carbon single bond or a carbon-carbon double bond between C–1 and C–2.

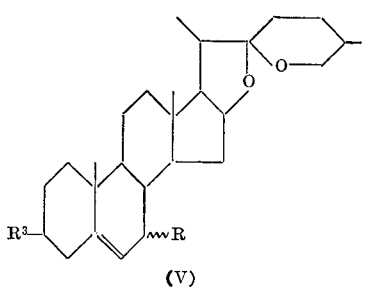
(V)

and

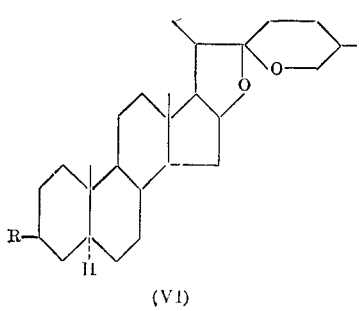
(VI)

wherein R and R$^3$ are as defined above.

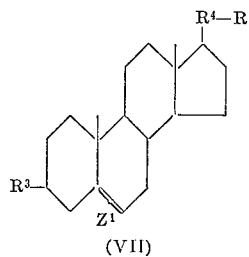
(VII)

wherein
R and R$^3$ are as defined above;
R$^4$ is a lower alkylene of one to eight carbon atoms; and
Z$^1$ is a carbon-carbon single bond or a carbon-carbon double bond between C–5 and C–6.

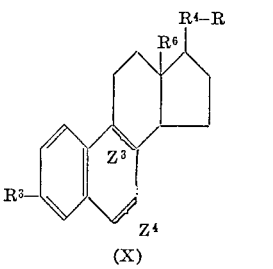 and 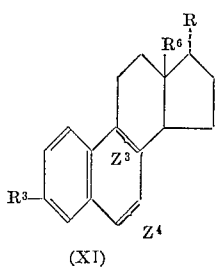
(VIII)    (IX)

wherein
R and R$^3$ are as defined above;
R$^5$ is methyl or ethyl; and
Z$^2$ is a carbon-carbon single bond or a carbon-carbon double bond between C–22 and C–23.

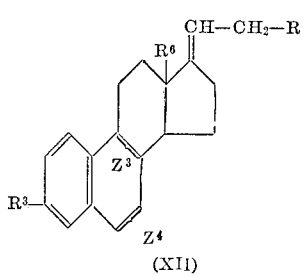
(X)    (XI)

and (XII)

wherein
R, R$^3$ and R$^4$ are as defined above;
R$^6$ is hydrogen, methyl, ethyl or propyl;
Z$^3$ is a carbon-carbon single bond or a carbon-carbon double bond between C–8 and C–11; and $Z^4$ is a carbon-carbon single bond or a carbon-carbon double bond between C–6 and C–7, provided that when $Z^4$ is a double bond that $Z^3$ is a double bond.

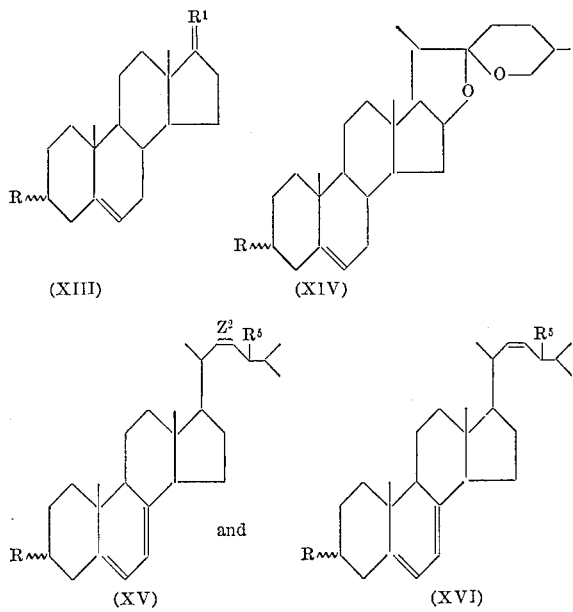

wherein R, $R^1$, $R^5$ and $Z^2$ are as defined above.

The expression "lower alkyl," as used herein, refers to lower saturated aliphatic hydrocarbons, branched and straight chain, such as methyl, ethyl, propyl, isopropyl, n-hexyl, n-pentyl, s-butyl, octyl, and the like. Preferred are the lower alkyl groups of one to ten carbon atoms associated with naturally occurring sterols, such as cholesterol, campesterol, ergostanol, sitosterol, stigmasterol, clionasterol, and the like. The expression "lower alkylene," as used herein, refers to lower saturated divalent aliphatic hydrocarbons, branched and straight chain, such as methylene, ethylidene, propylidene, isopropylidene, butylidene, pentamethylene, trimethylene, tetramethylene, and dimethylene of one to eight carbon atoms.

The expression "pharmaceutically acceptable anion," as used herein, refers to a pharmaceutically acceptable anion of an inorganic or organic acid conventionally used in the pharmaceutical art derived from acids, such as sulfuric, hydrochloric, hydrobromic, hydroiodic, nitric, phosphoric, lactic, benzoic, methanesulfonic, p-toluenesulfonic, salicyclic, acetic, propionic, maleic, tartaric, citric, cyclohexylsulfamic, succinic, nicotinic, ascorbic acids, and the like.

The expression "pharmaceutically acceptable esters and ethers thereof," as used herein, refers to pharmaceutically acceptable esters and ethers conventionally employed in the steroid pharmaceutical art. Typical of these esters and ethers are acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β - chloropropionate, bicyclo[2.2.2]octane-1'-carboxylate, adamantoate, dihydrogen phosphate, dibenzyl phosphate, sodium ethyl phosphate, sodium sulfate, sulfate, tetrahydropyran-2'-yl ether, tetrahydrofuran-2'-yl ether, 4'-methoxytetrahydropyran-4'-yl ether, methyl ether, ethyl ether, cyclopentyl ether, cyclohexyl ether, propyl ether, and the like.

The quaternary ammonium steroids of the present invention are effective against bacteria and fungi, such as *Bacillus subtilis, Staphylococcus aureus, Escherichia coli, Proteus vulgaris, Salmonella paratyphi, Pseudomonas aeruginas, Shigella sonnei, Microsporum gypseum, Candido, albicans, Trichophytom mentagrophytes, Streptococcus pyogenes, Diplococcus pneumonia, N. asteroides, Cr. neoformans* and *S. schenshii*. The novel compounds are effective in controlling bacteria and fungi within a wide dosage range. Depending upon such factors as the degree and severity of infection, the type of bacteria or fungi, the compounds of the present invention are biocidal or biostatic. The compounds of the present invention can be used in solutions, sprays, and the like, for disinfecting inanimate objects or can be used topically in the form of ointments, creams, solutions, sprays, and the like, for treating bacterial infections of animals.

The following examples are provided to illustrate the present invention.

EXAMPLE 1

(A) To a mixture of 1 g. of 3β-hydroxyandrost-5-en-17-one in 50 ml. of benzene is added 1.5 g. of phosphorus tribromide. The reaction mixture is refluxed for about one hour under anhydrous conditions and then cooled and poured into water. The organic layer is washed with water several times, dried over sodium sulfate and evaporated to dryness to yield 3β-bromoandrost-5-en-17-one.

By repeating the above procedure using phosphorous trichloride in chloroform, there is obtained 3β-chloro-androst-5-en-17-one.

Alternatively, thionyl bromide and thionyl chloride in a dry ether solvent at about room temperature can be used to prepare 3-bromo and 3-chloro derivatives from the corresponding 3-hydroxyl.

(B) A mixture of 2 g. of 3β-bromoandrost-5-en-17-one, 100 ml. of xylene and 10 molar equivalents of 1,5-diazabicyclo[4.3.0]non-5-ene is refluxed under nitrogen for about two hours with stirring. The reaction mixture is cooled, concentrated under vacuum and the residue washed with hexane. The insoluble portion of the residue is dissolved in dilute aqueous sodium chloride and extracted with chloroform. The chloroform extracts are combined and evaporated to dryness to yield 3β-[5'-(1',5'-diazabicyclo[4.3.0]nonenyl)]androst - 5 - en-17-one bromide (XIII; $R^1$ is oxo, m is three, n is three, x is bromo).

By using 3β-chloroandrost-5-en-17-one as the starting material, there is obtained 3β-[5'-(1',5'-diazabicyclo-[4.3.0]nonenyl)]androst-5-en-17-one chloride.

EXAMPLE 2

The procedure of Example 1A is repeated using 3β-hydroxy-5α-androstan-17-one and 3β-hydroxyandrost-4-ene as the starting material and there is obtained 3α-bromo-5α-androstan-17-one and 3β-bromoandrost-4-ene. The thus-obtained steroidal bromides are treated according to the procedure of Example 1B to afford 3β-[5'-(1',5'-diazabicyclo[4.3.0]nonenyl)] - 5α - androstan-17-one bromide and a mixture of 3β-[5'-(1',5'-diazabicyclo-[4.3.0]nonenyl)]androst-4-ene and 3α-[5'-(1',5'-diazabicyclo[4.3.0]nonenyl)]androst-4-ene.

EXAMPLE 3

(A) A mixture of 2 g. of 3β acetoxyandrost-5-en-17-one, 1 molar equivalent of N-bromosuccinimide, and 100 ml. of hexane is stirred under nitrogen and irradiated with a 375 watt bulb for about 15 minutes. The reaction mixture is poured into ice-water, filtered and the solid washed with hexane. The filtrate is dried and evaporated to dryness to yield 7β-bromo-3β-acetoxyandrost-5-en-17-one.

(B) The product of part A is dissolved in hexane and 5 molar equivalents of 1,5-diazabicyclo[4.3.0]non-5-ene added. The reaction mixture is refluxed under nitrogen for 1.5 hours. The reaction mixture is then evaporated in vacuo, the residue triturated with cold, fresh hexane, decanted and the residue dissolved in methanol. The methanol solution is slowly filtered through a column of ion-exchange resin (OH⁻ form) with methanol. The eluate is then passed through a column of ion-exchange resin (Cl⁻ form) with methanol and the eluate evaporated in vacuo. The residue is dissolved in chloroform, washed with saturated aqueous sodium chloride, and evaporated. The residue is dissolved in methanol, treated with charcoal, filtered and the filtrate concentrated by boiling. Benzene is added to the concentrate, heated, cooled and filtered to yield a mixture of 7α-[5'-(1',5'-diazabicyclo[4.3.0]nonenyl)]-3β-hydroxyandrost - 5 - en-17-one chloride and 7β-[5'-(1',5'-diazabicyclo[4.3.0]nonenyl)] - 3β - hydroxyandrost-5-en-17-one chloride which can be separated by fractional crystallization.

EXAMPLE 4

A mixture of 2 g. of cholesteryl acetate, 1 g. of N-bromosuccinimide and 80 ml. of hexane is stirred under nitrogen and irradiated with a 375 watt photoflood lamp for 15 minutes. The mixture is cooled in ice and filtered. To the filtrate is added 20 ml. of 1,5-diazabicyclo[5.4.0]-undec-5-ene and the resulting mixture is refluxed under nitrogen for 1.5 hours. The reaction mixture is cooled, concentrated and the residue washed with hexane. The solid obtained is redissolved in methanol, and filtered through a column of ion-exchange resin (OH⁻ form) and then through ion-exchange resin (Cl⁻ form). The eluate is evaporated in vacuo and the residue obtained redissolved in chloroform and washed with saturated aqueous sodium chloride. The chloroform solution is evaporated in vacuo, the residue evaporated with a little more chloroform, and the solution filtered. The filtrate is evaporated in vacuo, a little methanol added followed by benzene and the solution concentrated by boiling to yield a mixture of 7α-[5'-(1',5'-diazabicyclo[5.4.0]undecenyl)]-3β-hydroxycholest-5-ene chloride and 7β-[5'-(1',5'-diazabicyclo[5.4.0]undecenyl)] - 3β - hydroxycholest-5-ene chloride.

EXAMPLE 5

The procedure of Example 3B is repeated using 7β-bromo-3β-acetoxycholest-5-ene at the starting material in place of 7β-bromo-3β-acetoxyandrost-5-en-17-one, there is obtained a mixture of 7α-[5'-(1',5'-diazabicyclo[4.3.0]-nonenyl)]-3β-hydroxycholest-5-ene chloride and 7β-[5'-(1',5' - diazabicyclo[4.3.0]nonenyl)] - 3β - hydroxycholest-5-ene-chloride.

By using 7β-bromocampesterylacetate and 7β-bromositosterylacetate (prepared according to U.S. Pat. 2,568,025) as the starting material in the process of Example 3B, there is obtained a mixture of 7α-[5'-(1',5'-diazabicyclo[4.3.0]nonenyl)]campest - 5 - en-3β-ol chloride and 7β-[5'-(1',5' - diazabicyclo[4.3.0]nonenyl)]-campest-5-en-3β-ol chloride and a mixture of 7α-[5'-(1',5'-diazabicyclo[4.3.0]-nonenyl)]sitost - 5 - en-3β-ol chloride and 7β-[5'-(1',5'-diazabicyclo[4.3.0]nonenyl)]-sitost-5-en-3β-ol chloride, respectively.

In the case of Examples 3, 4 and 5, in the work-up of the reaction product, the filtering through a chloride form ion-exchange column can be eliminated and in which case the final products obtained bear a bromide anion instead of the chloride anion.

EXAMPLE 6

A mixture of 2 g. of 3β-chlorocholest-4-ene, 10 molar equivalents of 1,5-diazabicyclo[4.3.0]non-5-ene and 150 ml. of xylene is refluxed under nitrogen with stirring for two hours. The reaction mixture is evaporated in vacuo and the residue washed with hexane. The insoluble portion is mixed into dilute aqueous sodium chloride and extracted with chloroform which is evaporated in vacuo to yield 3β-[5' - (1',5' - diazabicyclo[4.3.0]nonenyl)]-cholest-4-ene chloride.

By using cholesteryl iodide as the steroidal halide starting material in the procedure of this example, there is obtained 3β-[5' - (1',5' - diazabicyclo[4.3.0]nonenyl)]-cholest-5-ene iodide. Cholesteryl idodide can be obtained as described in U.S. Pat. 2,311,050. 3β-Chlorocholest-4-ene is prepared by treating 3β-hydroxycholest-4-ene with thionyl chloride according to the procedure of Example 1A. Similarly, 3β-bromoandrost-4-ene is obtained by treating androst-4-en-3β-ol with thionyl bromide.

EXAMPLE 7

The procedure of Example 6 is repeated with the exception that an equivalent amount of the 3-bromo derivative of diosgenin is used as the steroidal halide starting material to yield 3β - [ - 5' - (1',5' - diazabicyclo[4.3.0] nonenyl)]spirost-5-ene bromide. In the same manner, the 3-bromo derivative of tigogenin is converted into 3β-[5'-(1',5'-diazabicyclo[4.3.0]nonenyl)] - 5α - spirostane bromide.

7β-bromodiosgenin acetate is subjected to the procedure of Example 3B and there is obtained a mixture of 7α-[5'-(1',5'-diazabicyclo[4.3.0]nonenyl)]spirost - 5 - ene chloride and 7β-[5' - (1',5'-diazabicyclo[4.3.0]nonenyl)]-spirost-5-ene chloride. By repeating this procedure with exception of omitting the chloride form ion-exchange filtration in the work-up, there is obtained the corresponding bromide.

The steroidal halide (3-bromo derivative of diosgenin and 3-bromo derivative of tigogenin) can be prepared by treatment of the 3-hydroxy steroid with phosphorus tribromide and thionyl bromide, respectively, as described in Example 1A. The 7-bromo steroidal halide can be obtained by treating diosgenin acetate with a halogenating agent such as N-bromosuccinimide according to the procedure of U.S. Pats. 2,531,688 or 2,577,226.

EXAMPLE 8

Ergosterol is subjected to the procedure of Example 1A and B in place of 3β-hydroxyandrost-5-en-17-one to yield 3β-[-5'-(1',5' - diazabicyclo[4.3.0]nonenyl)]ergosteryl bromide and the corresponding chloride. Similarly, ergosteryl iodine (obtained according to U.S. Pat. 2,311,-050) is converted into 3β-[5'-(1',5'-diazabicyclo[4.3.0] nonenyl)]ergosteryl iodide.

Ergosteryl acetate is hydrogenated using a palladium-charcoal catalyst until the theoretical amount of hydrogen is consumed to obtain the 5,6,22,23-tetrahydro derivative which is subjected to the process of Example 4 to yield a mixture of 6α-[5'-(1',5'-diazabicyclo[4.3.0]nonenyl)]-5α-cholest-7-ene chloride and 6β-[5'-(1',5'-diazabicyclo [4.3.0]nonenyl)]-5α-cholest-7-ene chloride.

EXAMPLE 9

Estrone methyl ether is treated with methylenetriphenylphosphorane to obtain the 17-methylene derivative thereof which is treated with diborane followed by hydrogen peroxide by the method of U.S. Pat. 3,385,849 to yield 3-methoxy-17β - hydroxymethylestra - 1,3,5(10)-triene which is reacted with phosphorus tribromide to yield 17β - bromomethyl-3-methoxyestra-1,3,5(10)-triene. The thus-obtained steroidal halide is subjected to the procedure of Example 1B to yield 20β-[5'-(1',5'-diazabicyclo[4.3.0]nonenyl)] - 3 - methoxyestra - 1,3,5(10)-triene bromide (X; R³ is methoxy, R⁶ is methyl, R⁴ is methylene, Z³ and Z⁴ are single bond, m is three, n is three).

The 3-methyl ether of 3,20-dihydroxy-19-norpregna-1,3,5(10)-triene is treated with phosphorus tribromide to afford the 20-bromo derivative which is subjected to the procedure of Example 1B to yield a mixture of the α and β isomer of 20-[5'-(1',5'-diazabicyclo[4.3.0]nonenyl)]-3-methoxy-19-norpregna-1,3,5(10)-triene.

EXAMPLE 10

The following steroidal chlorides: 25-chloro-27-norcholest-5-en-3β-ol; 25-chloro-27-norcholest-5-en - 3 - one; and 24-chloro-3β-acetoxy-27-norcholest-5-ene (prepared according to U.S. 2,673,206) are used as the starting material in the process of Example 1B to yield: 25-[5'-(1',5'-diazabicyclo[4.3.0]nonenyl)] - 27 - norcholest-5-en-3β-ol chloride; 25-[5' - (1',5' - diazabicyclo[4.3.0]nonenyl)]-27-norcholest-5-en-3-one chloride; and 24-[5'-(1',5'-diazabicyclo[4.3.0]nonenyl)]-27-norcholest-5 - en - 3β-ol chloride.

EXAMPLE 11

The procedure of Example 1A and B is repeated using an equivalent amount of α-spinasterol as the starting material to yield 3β-[5'-(1',5'-diazabicyclo[4.3.0]nonenyl)] α-spinasteryl bromide. In the same manner, androst-5-ene-3β,17β-diol 17-benzoate and 5α-androstan-3β,17β-diol 17-benzoate are converted into 3β-[5'(1',5'-diazabicyclo [4.3.0]nonenyl)]-androst-5-en-17β-ol bromide and 3β-[5'-(1',5'-diazabicyclo][4.3.0]nonenyl)] - 5α - androstan-17β-ol bromide.

EXAMPLE 12

The process of Example 4 is repeated using an equivalent amount of androst-5-en-17β-ol 17-acetate and androst-5-ene-3β-17β-diol 3,17-diacetate as the starting material to yield a mixture of the α and β isomers of 7-[5'(1',5'-diazabicyclo[5.4.0]undecenyl)]androst - 5 - en-17β-ol chloride and a mixture of the α and β isomers of 7-[5' - (1',5' - diazabicyclo[5.4.0]undecenyl)]androst-5-ene-3β,17β-diol chloride. By repeating this procedure using 1,5-diazabicyclo-[4.3.0]non-5-ene in place of 1,5-diazabicyclo[5.4.0]undec-5-ene, the corresponding 1,5-diazabicyclo[4.3.0]nonenyl chlorides are obtained.

By using an equivalent amount of androst-4-ene-3β, 17β-diol 17-acetate in the procedure of Example 1A and B, there is obtained 3-[5'-(1',5'-diazabicyclo[4.3.0] nonenyl)]androst-4-en-17β-ol bromide.

EXAMPLE 13

The processes of Example 1A and B are repeated with the exeception of using an equivalent amount of (1) pregn-5-ene-3β,20β-diol 3-acetate, (2) 5α-pregnane-3β, 20β-diol 3-acetate, (3) pregn-5-ene-3β,21-diol 3-acetate and (4) 5α-pregnane-3β,21-diol 3-acetate as the starting material to yield (1) 20-[5'-(1',5'-diazabicyclo[4.3.0] nonenyl)]pregn-5-en-3β-ol bromide, (2) 20-[5'-(1',5'-diazabicyclo[4.3.0]nonenyl)]-5α-pregnan-3β-ol bromide, (2) 21-[5' - (1',5' - diazabicyclo[4.3.0]nonenyl)]pregn-5-en-3β-ol bromide and (4) 21-[5'-(1',5'-diazabicyclo [4.3.0]nonenyl)]-5α-pregnan-3β-ol bromide, respectively.

By using an equivalent amount of (5) 17β-hydroxymethylandrost-5-en-3β-ol 3-acetate,
(6) 17β-hydroxymethyl-5α-androstan-3β-ol 3-acetate,
(7) 20-hydroxymethylpregn-5-en-3β-ol 3-acetate,
(8) 3β-acetoxy-22-hydroxymethyl-23,24-bisnorchol-5-ene,
(9) 3β-acetoxy-22-hydroxymethyl-23,24-bisnor-5α-cholane,
(10) 3β-acetoxy-23-hydroxymethyl-24-norchol-5-ene and
(11) 3β-acetoxy-23-hydroxymethyl-24-nor-5α-cholane in place of 3β-hydroxyandrost-5-en-17-one in the procedures of Example 1A and B, there is obtained (5) 20-[5'-(1',5'-diazabicyclo[4.3.0]nonenyl)]androst-5-en-3β-ol bromide,
(6) 20-[5'-(1',5'-diazabicyclo[4.3.0]nonenyl)]-5α-androstan-3β-ol bromide,
(7) 22-[5'-(1',5'-diazabicyclo[4.3.0]nonenyl)]-23-norchol-5-en-3b-ol bromide,
(8) 23-[5'-(1',5'-diazabicyclo[4.3.0]nonenyl)]-24-norchol-5-en-3β-ol bromide,
(9) 23-[5'-(1',5'-diazabicyclo[4.3.0]nonenyl)]-24-nor-5α-cholan-3β-ol bromide,
(10) 24-[5'-(1',5'-diazabicyclo[4.3.0]nonenyl)]chol-5-en-3β-ol bromide and
(11) 24-[5'-(1',5'-diazabicyclo[4.3.0]nonenyl)]-5α-cholan-3β-ol bromide, respectively.

The following is a typical procedure which can be used for preparing the above alcohols.

A solution of 1 g. of 3β-acetoxy-5α-androstane-17β-carboxylic acid in 50 ml. of tetrahydrofuran is added over a 30 minute period to a stirred suspension of 1 g. of lithium aluminum hydride in 50 ml. of anhydrous tetrahydrofuran and this mixture is heated at reflux for two hours. To this mixture is cautiously added 5 ml. of ethyl acetate and 2 ml. of water. Sodium sulfate is next added, the mixture is filtered and the solid thus collected is washed with hot ethyl acetate. The combined organic solutions (filtrate and washings) are then evaporated to yield 17β-hydroxymethyl-5α-androstan-3β-ol 3 - acetate which may be further purified through recrystallization from acetone:hexane.

In a similar manner,

3β-acetoxypregn-5-ene-20-carboxylic acid,
3β-acetoxy-23,24-bisnorchol-5-ene-22-carboxylic acid,
3β-acetoxy-23,24-bisnor-5α-cholane-22-carboxylic acid,
3β-acetoxy-5α-cholanoic acid,
3β-acetoxychol-5-enoic acid and
3β-acetoxyandrost-5-en-17β-carboxylic acid are converted into the corresponding alcohol.

EXAMPLE 14

A mixture of 1 g. of 7β-[5'-(1',5'-diazabocyclo[4.3.0] nonenyl)]cholest-5-en-3β-ol bromide, 10 ml. of acetic anhydride and 10 ml. of pyridine is stirred and left to stand overnight. The reaction mixture is then poured into icewater and the solid which forms is collected by filtration, washed with water, and dried to yield 7β-[5'-(1',5'-diazabicyclo[4.3.0]nonenyl)]cholest-5-en-3β-ol diacetate.

Similarly, through the use of other carboxylic anhydrides in the above process, such as propionic anhydride, trifluoroacetic anhydride, butyric anhydride, benzoic anhydride, trimethylacetic anhydride, and the like, other diacylates can be prepared.

A solution of 1 g. of 7β-[5'-(1',5'-diazabocyclo[4.3.0] nonenyl)]cholest-5-en-3β-ol diacetate in 100 ml. of chloroform is saturated with a stream of HCl gas and allowed to stand for about one hour. The reaction mixture is then evaporated to dryness to yield 7β-[5'-(1',5'-diazabicyclo[4.3.0]nonenyl)]cholest - 5 - en-3β-ol 3-acetate chloride which can be purified using chromatography or recrystallization.

EXAMPLE 15

A mixture of 100 mg. of 24-iodo-5β-cholane, 5 ml. of benzene and 0.1 g. of 1,5-diazabicyclo[4.3.0]non-5-ene is stirred at about 20° for 24 hours. The reaction mixture is then evaporated, the residue dissolved in methanol, and the methanol solution filtered through a column of ion-exchange resin (Cl⁻ cycle) to yield 24-[5'-(1',5'-diazabicyclo[4.3.0]nonenyl)]-5β-cholane chloride.

EXAMPLE 16

The process of Example 1B is repeated using 16β-bromoestr-5(10)-en-17-one, 6α-chloro - 16α - methyl-5α-pregn-2-ene-17α,21-diol-11,20-dione and 6α-chloro-21-dimethylaminomethyl-Δ¹-progresterone as the steroidal halide starting material to yield 16α-[5'-(1',5'-diazabicyclo[4.3.0] - nonenyl)]estr-5(10)-en-17-one bromide, 6β-[5'(1',5' - diazabicyclo[4.3.0]nonenyl)]-16α-methyl-5α-pregn-2-ene-17α,21-diol-11,20-dione chloride and 6β-[5'-(1',5'-diazabicyclo[4.3.0]nonenyl)] - 21 - dimethylaminomethyl-Δ¹-progesterone.

Androst-1-ene-3β,17β-diol and 2β-hydroxymethyl-19-nor-5α-pregnane-20-one are converted into 3β-chloroandrost-1-en-17β-ol and 2β-chloromethyl- 19 - nor-5α-pregnane-20-one using thionyl chloride which are converted into 3 - [5' - (1',5' - diazabicyclo[4.3.0]nonenyl)] androst-1-en-17β-ol chloride and 2β-[5'-(1',5'-diazabicyclo[4.3.0]nonenyl)]-methyl-19-nor - 5α - pregnane-20-one chloride.

EXAMPLE 17

The process of Example 4 is repeated using 3β-acetoxypregn-5-en-20-one to yield a mixture of the α and β isomers of 7-[5'-(1',5'-diazabicyclo[5.4.0]undecenyl)] 3β-hydroxypregn-5-en-20-one chloride. By using 1,5-diazabicyclo[4.3.0]non-5-ene in this procedure, there is obtained 7 - [5'-(1',5'-diazabicyclo[4.3.0]nonenyl)]-3β-hydroxypregn-5-en-20-one chloride.

EXAMPLE 18

The 3-acetate of Δ⁷-ergostenol is used as the starting material in the process of Example 3 to yield 6-[5'-(1',5'-diazabicyclo[4.3.0]nonenyl)]-Δ⁷-ergostenol chloride. The 3-acetate of Δ⁷-ergostenol is prepared by treating Δ⁷-ergostenol with acetic anhydride in pyridine.

EXAMPLE 19

The reaction of 6α-bromocholestane, 3β-chlorocholestane, 20-chloropregn-4-en-3-one, 3β-chloroandrost-1-en-17β-ol 17-acetate, 6β-chloro-17α-methyl - B - nortestosterone, 3β - methoxy-7β-chloro - B - homoestr-5(10-en-17-one and 3β-methoxy-6β-chloromethylestr-5(10)-en-17-one with 1,5-diazabicyclo[4.3.0]non-5-ene according to the procedure of Example 6 yield 6β-[5'-(1',5'-diazabicyclo[4.3.0]nonenyl)]cholestane bromide, 3α-[5'-(1',5'-diazabicyclo[4.3.0]nonenyl)]cholestane chloride, 20-[5'-(1',5'-diazabicyclo[4.3.0]nonenyl)]pregn-4-en - 3 - one chloride, 3β-[5' - (1',5' - diazabicyclo[4.3.0]-nonenyl)] androst-1-en-17β-ol chloride, 6-[5'-(1',5'-diazabicyclo[4.3.0]nonenyl)]-17α-methyl-B-nortestosterone chloride, 3β-methoxy - 7 - [5' - (1',5' - diazabicyclodiaza[4.3.0] nonenyl)]-B-homoestr-5(10)-en-17-one chloride and 3β-methoxy - 6β - [5'-(1',5'-diazabicyclo[4.3.0]nonenyl)] methylestr-5(10)-en-17-one chloride, respectively.

EXAMPLE 20

(A) A solution of 1 g. of sodium borohydride in 3 ml. of water is added to an ice-cooled solution of 1 g. of 3 - methoxy-19-norpregna-1,3,5(10),17(20)-tetraen-21-al in 120 ml. of methanol and the mixture then allowed to stand for 16 hours at room temperature. Excess reagent is decomposed by the addition of acetic acid and the solution is then concentrated to small volume under vacuum and diluted with water. The product is extracted with ethyl acetate and the extracts are washed with water, dried and evaporated to yield 3-methoxy-19-norpregna-1,3,5,(10),17(20)-tetraen-21-ol.

(B) The above 21-hydroxy-3-methoxy-19-norpregna-1,3,5(10),17(20)-tetraene is converted into the corresponding 21-bromo compound which is reacted with 1,5-diazabicyclo[4.3.0]non-5-ene according to the procedure of Example 1 to yield 21-[5'-(1',5'-diazabicyclo[4.3.0] nonenyl)] - 3 - methoxy-19-norpregna-1,3,5(10),17(20)-tetraene bromide.

The 21-aldehyde used in part A of this example is prepared from the corresponding 17-keto compound using the procedure of U.S. Patent 3,374,253. Similarly, 3-methoxy-18-methylestra-1,3,5(10),8-tetraen-17-one and 3-methoxy-estra-1,3,5(10),6,8-pentaen-17-one are converted into 3-methoxy - 19 - nor-18-methylpregna-1,3,5(10),8,17(20)-pentaen-21-al and 3-methoxy-19-norpregna-1,3,5(10),6,8,17(20)-hexaen-21-al which are treated according to part A and B of this example to yield 21-[5'-(1',5'-diazabicyclo [4.3.0]nonenyl)] - 3 - methoxy - 18-methyl-19-norpregna-1,3,5(10),8,17(20)-pentaene bromide and 21-[5'-(1',5'-diazabicyclo[4.3.0]nonenyl)] - 3 - methoxy-19-norpregna-1,3,5(10),6,8,17(20)-hexaene bromide.

EXAMPLE 21

The procedure of Example 20 is repeated using 3-methoxy - 19 - norpregna - 1,3,5(10)-trien-21-one, 3-methoxy - 18 - methyl - 19-norpregna-1,3,5(10)-trien-21-one and 3-methoxy-19-norpregna-1,3,5(10),8-tetraen-21-one as the starting material to yield 21-[5'-(1',5'-diazabicyclo[4.3.0]nonenyl)] - 3 - methoxy-19-norpregna-1,3,5 (10) - triene bromide, 21-[5'-(1',5'-diazabicyclo[4.3.0] nonenyl)] - methoxy - 18-methyl-19-norpregna-1,3,5(10)-triene bromide and 21-[5'-(1',5'-diazabicyclo[4.3.0]nonenyl] - 3 - methoxy - 19-norpregna-1,3,5(10),8-tetraene bromide, respectively.

3 - Methoxy - 19-norpregna-1,3,5(10)-trien-21-one, 3-methoxy - 18 - methylpregna - 1,3,5(10)-trien-21-one and 3 - methoxy - 19 - norpregna-1,3,5(10),8-tetraen-21-one are obtained by catalytic hydrogenation of 3-methoxy-19-norpregna - 1,3,5(10),17(20) - tetraen-21-al, 3-methoxy-18 - methyl - 19-norpregna-1,3,5(10),17(20)-tetraen-21-al and 3-methoxy-19-norpregna-1,3,5(10),8,17(20)-pentaen-21-al, respectively, using palladium-on-carbon. See, for example, U.S. Patent 3,120,518.

EXAMPLE 22

A mixture of 1 g. of 3-methoxyestra-1,3,5(10)-trien-17β-ol in 5 ml. of pyridine and 0.5 g. of methanesulfonyl chloride is allowed to stand at room temperature for 24 hours and is then diluted with water and filtered. The solid thus collected is dried and recrystallized from acetone: hexane to yield 17β-methanesulfonyloxy-3-methoxyestra-1,3,5(10)-triene.

By using p-toluenesulfonyl chloride in the above procedure, the corresponding 17-tosylate is obtained.

The above compounds are reacted with 1,5-diazabicyclo[4.3.0]non-5-ene using the procedure of Example 1B to yield 17α-[5'-(1',5'-diazabicyclo[4.3.0]nonenyl)]-3-methoxyestra-1,3,5(10)-triene methanesulfonate and 17α-[5' - (1',5'-diazabicyclo[4.3.0]nonenyl)]-3-methoxyestra-1,3,5(10)-triene p-toluenesulfonate.

EXAMPLE 23

A mixture of 1 g. of 7α-bromo-3β,17β-diacetoxy-5α-androstane, 50 ml. of hexane and 4 molar equivalents of 1,5-diazabicyclo[4.3.0]non-5-ene is refluxed under nitrogen for three hours with stirring. The reaction mixture is cooled, concentrated under vacuum and the residue washed with hexane. The insoluble portion of the residue is dissolved in aqueous sodium chloride and extracted with chloroform. The chloroform extracts are combined and evaporated to dryness to yield 7β-[5'-(1',5'-diazabicyclo[4.3.0]nonenyl)] - 5α - androstane - 3β,17β - diol bromide.

The above procedure is repeated using 6-chloro-17β-(1'-cyclohexenyloxy)-B-norandrost-4-en-3-one to yield 6-[5' - (1',5'-diazabicyclo[4.3.0]nonenyl)] - 17β-(1'-cyclohexenyloxy)-B-norandrost-4-en-3-one chloride.

7α-bromo-3β,17β-diacetoxy-5α-androstane can be prepared by treating 3β,17β-diacetoxy-5α-androstan-7-one with lithium tri(t-butoxy)aluminum hydride followed by bromination or chlorination of the thus formed hydroxyl using phosphorus tribromide or trichloride.

EXAMPLE 24

A mixture of 20 g. of 3β-acetoxycholest-5-ene, 10 g. of N-bromosuccinimide and 800 ml. of hexane is rapidly stirred under nitrogen and irradiated with two photoflood lamps (375 watt) for 15 minutes. The mixture is stirred in ice, filtered and the solid washed with hexane. The filtrate and 20 ml. of 1,5-diazabicyclo[4.3.0]non-5-ene is refluxed under nitrogen for 1.5 hours. The reaction mixture is then evaporated under vacuum and the residue triturated with cold hexane which is decanted. The residue is dissolved in methanol and filtered through a column of ion-exchange resin (OH⁻ form) in methanol. The eluate is then passed through a column of ion-exchange resin (Cl⁻ form) in methanol. The eluate is evaporated under vacuum. The residue is redissolved in chloroform which is washed with water containing saturated sodium chloride and evaporated under vacuum. The residue is redissolved in methanol, treated with charcoal, filtered through diatomaceous earth and the filtrate concentrated to small volume by heating. Benzene is added to the concentrate and the mixture heated until cloudy. The mixture is cooled and the crystalline solid filtered off to yield a mixture of the alpha and beta isomers of 7-[5'-(1',5'-diazabicyclo-[4.3.0]nonenyl)]cholest-5-en-3β-ol chloride.

The quaternary ammonium steroids of the present invention can be named either as a derivative of the steroid molecule as above or as derivative of the salt. For example, the quaternary ammonium steroid of Example 24 which has the following formula:

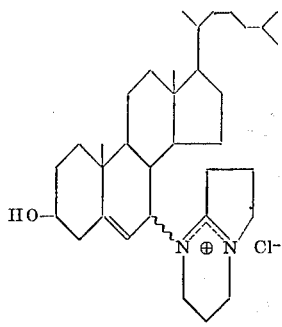

can be named either 7-[5'-(1',5'-diazabicyclo[4.3.0]nonenyl)]-cholest-5-en-3β-ol chloride or 5-(3'β-hydroxycholest - 5' - en-7'-yl)-1,5-diazabicyclo[4.3.0]nonenonium chloride.

What is claimed is:

1. A quaternary ammonium steroid selected from those of the following Formulas I, II, III and IV:

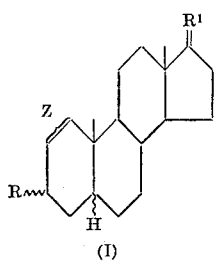 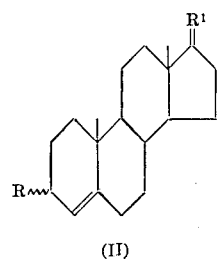

(I)          (II)

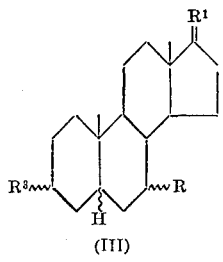 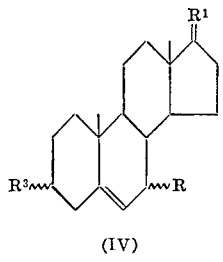

(III)         (IV)

wherein

R is the group

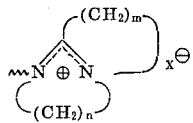

in which m is a positive integer of two to seven; n is a positive integer of two to four; and x is a pharmaceutically acceptable anion;

$R^1$ is oxo or the group

in which $R^2$ is hydrogen, hydroxy and pharmaceutically acceptable esters and ethers thereof, acetyl or lower alkyl of one to ten carbon atoms;

$R^3$ is hydrogen or hydroxy and pharmaceutically acceptable esters and ethers thereof; and Z is a carbon-carbon single bond or a carbon-carbon double bond between C–1 and C–2.

2. A steroid according to Formula I of claim 1 selected from those of the formula:

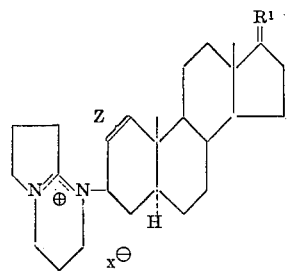

in which $R^1$, x and Z are as defined therein.

3. A steroid according to Formula II of claim 1 selected from those of the formula:

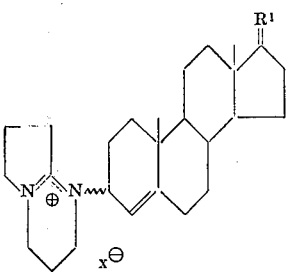

in which $R_1$ and x are as defined therein.

4. A steroid according to Formula III of claim I selected from those of the formula:

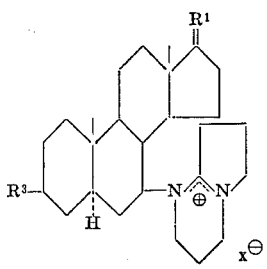

in which $R^1$ and x are as defined therein.

5. A compound according to Formula IV of claim 1 selected from those of the formula:

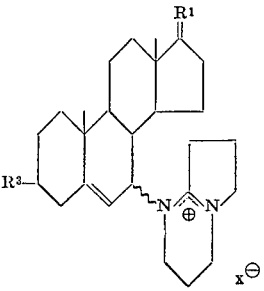

in which $R^1$, $R^3$ and x are as defined therein.

6. A compound according to claim 2 wherein Z is a single bond.

7. A compound according to claim 2 wherein Z is a single bond and $R^1$ is oxo.

8. A compound according to claim 3 wherein $R^1$ is oxo.

9. A compound according to claim 5 wherein $R^1$ is oxo and $R^3$ is hydroxy and pharmaceutically acceptable esters and ethers thereof.

10. A compound according to claim 5 wherein $R^1$ is the group

and $R^3$ is hydroxy and pharmaceutically acceptable esters and ethers thereof.

11. A compound according to claim 10 in which $R^2$ is the lower alkyl group

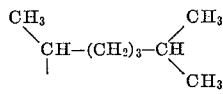

$R^3$ is hydroxy and $x$ is chloro.

12. A quaternary ammonium steroid selected from those of the Formulas V and VI:

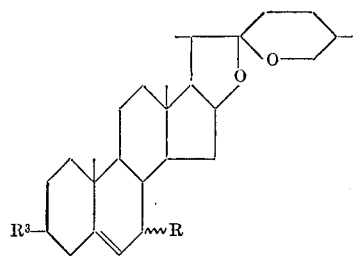

and

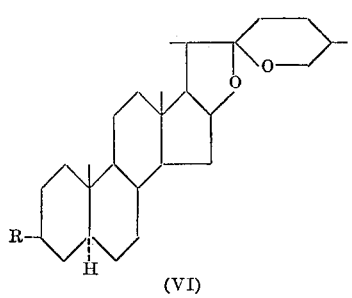

wherein
R is the group

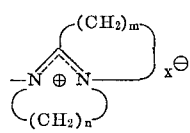

in which $m$ is a positive integer of two to seven; $n$ is a positive integer of two to four; and $x$ is a pharmaceutically acceptable anion; and
$R^3$ is hydrogen of hydroxy and pharmaceutically acceptable esters and ethers thereof.

13. A steroid according to Formula V of claim 12 selected from those of the formula:

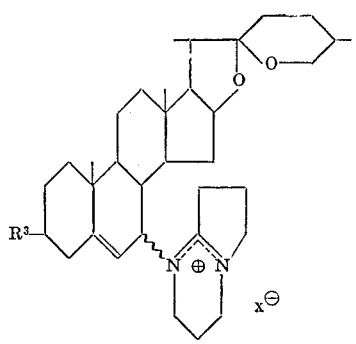

wherein $R^3$ is hydroxy and pharmaceutically acceptable esters and ethers thereof.

14. A steroid according to Formula VI of claim 12 wherein $m$ is three and $n$ is three.

15. A quaternary ammonium steroid selected from those of the Formula VII:

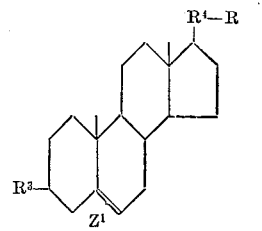

wherein
R is the group

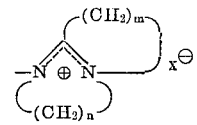

in which $m$ is a positive integer of two to seven; $n$ is a positive integer of two to four; and $x$ is a pharmaceutically acceptable anion;
$R^3$ is hydrogen or hydroxy and pharmaceutically acceptable esters and ethers thereof;
$R^4$ is a lower alkylene of one to eight carbon atoms; and
$Z^1$ is a carbon-carbon single bond or a carbon-carbon double bond between C-5 and C-6.

16. A steroid according to claim 15 wherein $R^4$ is methylene or ethylene and each of $m$ and $n$ is three.

17. A steroid according to claim 15 selected from those of the formula:

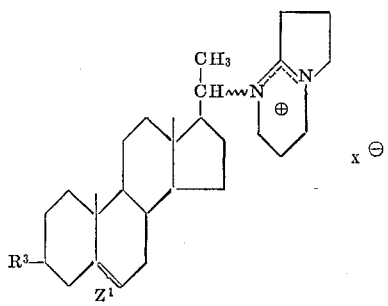

in which $R^3$, $x$ and $Z^1$ are as defined therein.

18. A steroid according to claim 15 selected from those of the formula:

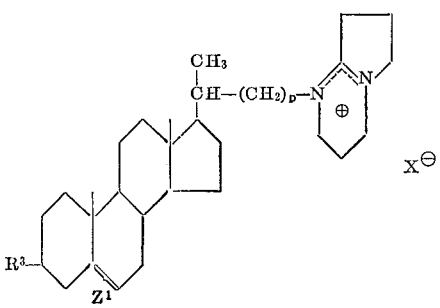

in which $R^3$, $x$ and $Z^1$ are as defined therein and $p$ is a positive integer of one to three.

19. A quaternary ammonium steroid selected from those of the Formulas VIII and IX:

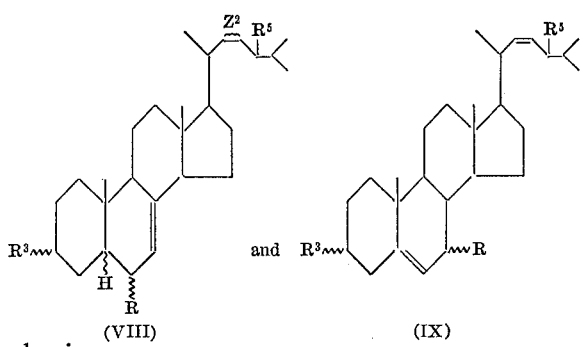

wherein
R is the group

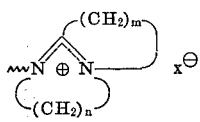

in which $m$ is a positive integer of two or seven; $n$ is a positive integer of two or four; and $x$ is a pharmaceutically acceptable anion;
$R^3$ is hydrogen or hydroxy and pharmaceutically acceptable esters and ethers thereof;
$R^5$ is methyl or ethyl; and
$Z^2$ is a carbon-carbon single bond or a carbon-carbon double bond between C-22 and C-23.

20. A steroid according to Formula VIII of claim 19 selected from those of the formula:

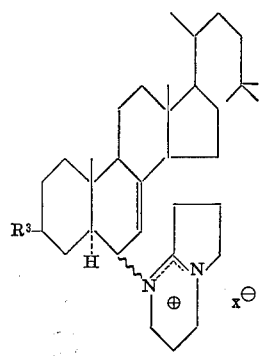

in which $R^3$ is hydroxy and pharmaceutically acceptable esters and ethers thereof and $x$ is as defined therein.

21. A quaternary ammonium steroid selected from those of the Formulas X, XI and XII:

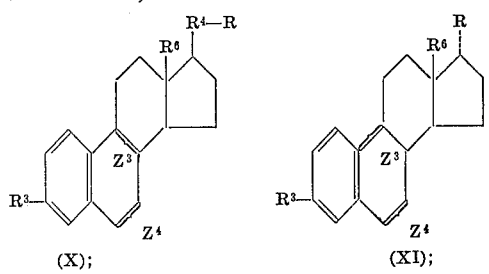

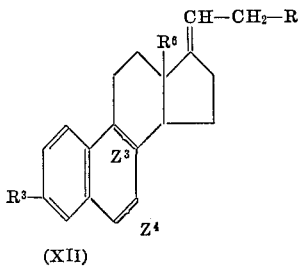

wherein
R is the group

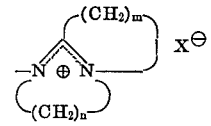

in which $m$ is a positive integer of two to seven; $n$ is a positive integer of two to four; and $x$ is a pharmaceutically acceptable anion;
$R^3$ is hydrogen or hydroxy and pharmaceutically acceptable esters and ethers thereof;
$R^4$ is a lower alkylene of one to eight carbon atoms;
$R^6$ is hydrogen, methyl, ethyl or propyl;
$Z^3$ is a carbon-carbon single bond or a carbon-carbon double bond between C-8 and C-11; and
$Z^4$ is a carbon-carbon single bond or a carbon-carbon double bond between C-6 and C-7, provided that when $Z^4$ is a double bond that $Z^3$ is a double bond.
from a 50:1 dilution to a 500:1 dilution. The results of these tests are set forth in accompanying Table IX.

22. A steroid according to Formula X of claim 21 wherein R is

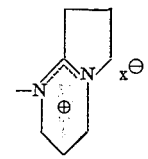

and $R^4$ is methylene or ethylene.

23. A steroid according to claim 22 wherein $R^3$ is methoxy and each of $Z^3$ and $Z^4$ is a single bond.

24. A steroid according to Formula X of claim 21 selected from those of the formula:

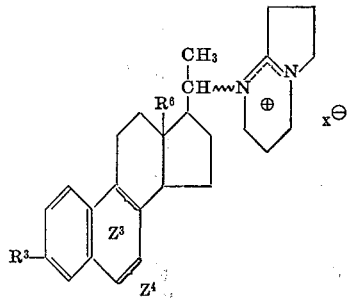

in which $R^3$, $R^6$, $x$, $Z^3$ and $Z^4$ are as defined therein.

25. A steroid according to claim 24 wherein $R^3$ is methoxy.

26. A quaternary ammonium steroid selected from those of the following Formulas XIII, XIV, XV and XVI:

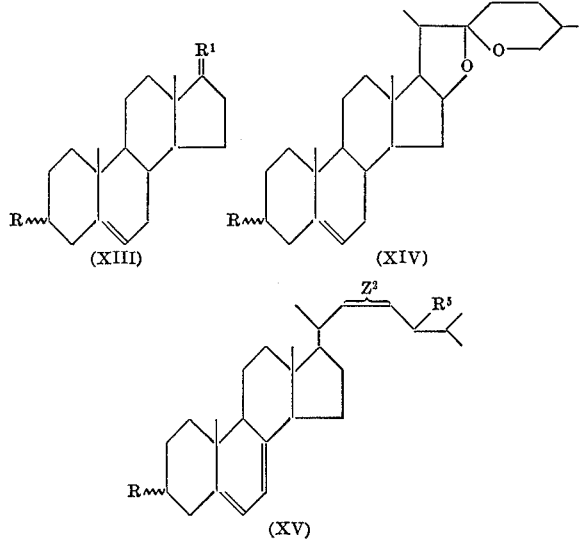

and

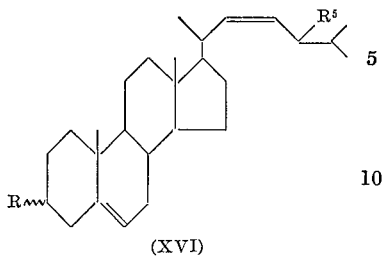

wherein
R is the group

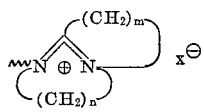

in which $m$ is a positive integer of two to seven; $n$ is a positive integer of two to four; and $x$ is a pharmaceutically acceptable anion;

$R^1$ is oxo or the group

in which $R^2$ is hydrogen, hydroxy and pharmaceutically acceptable esters and ethers thereof, acetyl or lower alkyl of one to ten carbon atoms;

$R^5$ is methyl or ethyl; and $Z^2$ is a carbon-carbon single bond or a carbon-carbon double bond between C–22 and C–23.

References Cited

UNITED STATES PATENTS 3,413,285  11/1968  Tsatsas _____ 260—239.5

ELBERT L. ROBERTS, Primary Examiner

U.S. Cl. X.R.

260—239.55, 397, 397.2, 397.3, 397.4, 397.5